May 20, 1958   J. W. GELLER   2,835,154
VEHICLE BODY STRAIGHTENING TOOL
Filed Jan. 18, 1954

INVENTOR.
James W. Geller
BY

2,835,154
VEHICLE BODY STRAIGHTENING TOOL

James W. Geller, Nampa, Idaho

Application January 18, 1954, Serial No. 404,419

4 Claims. (Cl. 81—15)

This invention is a vehicle body tool.

One object of the invention is to provide a vehicle body tool which has straps adapted to be secured to the body of a vehicle at selected locations and being provided with a constricting frame whereby the straps may be selectively tensioned to support portions of the body and draw them into correct relation with another.

Another object of the invention lies in the provision of a vehicle body tool having a constrictive frame adapted to tension straps having securing means on the free ends thereof, the straps being provided with means of adjustment whereby the tool is adjustable to fit vehicle bodies having varying dimensions.

Another object of the invention lies in the provision of a vehicle body tool including a constricting frame adapted to secure intermediate a pair of tension straps and the frame being adapted to receive a hydraulic ram whereby the constricting motion is manually controlled to the frame.

The nature and advantages of my invention will appear more fully from the following description and the accompanying drawings, wherein a preferred form of the invention is shown. It should be understood however that the drawings and description are illustrative only and are not intended to limit the invention except insofar as it is limited by the claims.

Figure 1:
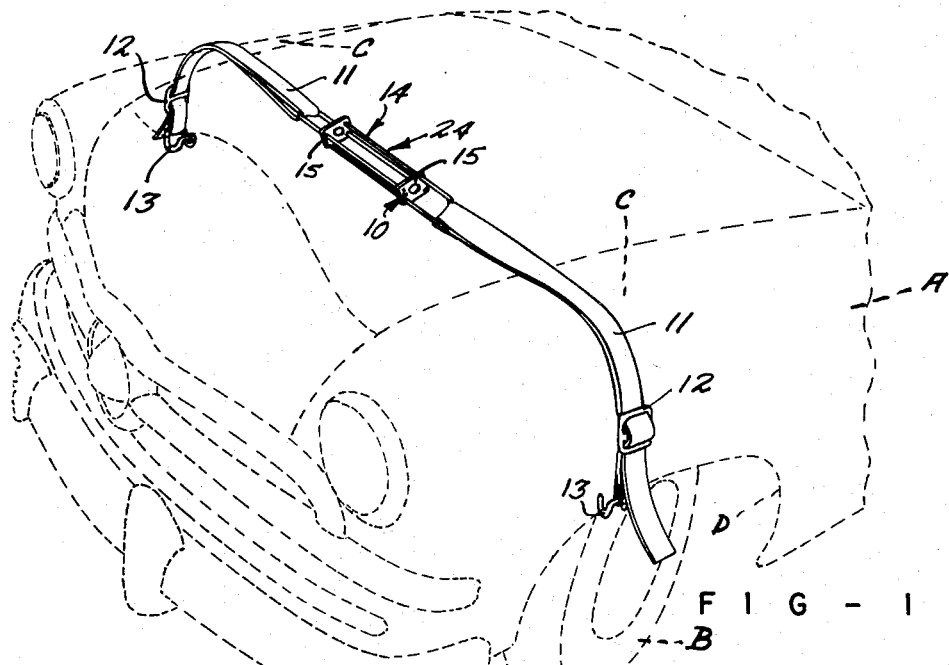
Figure 1 is a perspective view of a vehicle body tool embodying my invention.
Figure 2:
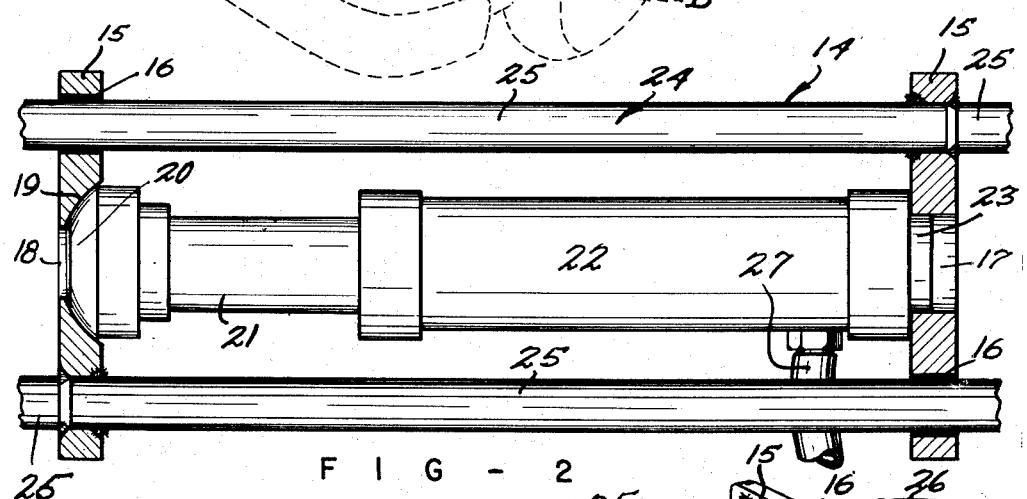
Figure 2 is a fragmentary enlarged horizontal cross section taken through the frame of the tool and showing the ram in position for operation; and, Figure 3 is a fragmentary perspective view upon an enlarged scale showing the constricting frame with the ram removed.
Figure 3:
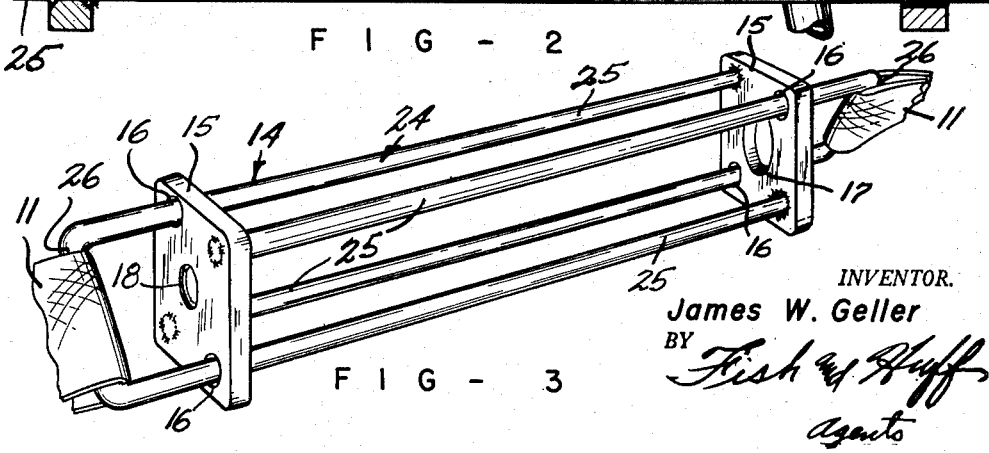

Referring now more particularly to the drawing, in Figure 1 I have shown by means of broken lines, one form of automobile or vehicle A having front steering wheels B and having the hood removed. The vehicle body tool is shown in position for supporting the front fenders C while they are being secured to the rest of the body or while other body work is being performed thereon.

The tool indicated in general by the numeral 10 is shown to comprise a pair of looped straps 11—11 which are each provided with a buckle 12 at one end and adapted to receive the opposed end of the strap to adjustably form the loops thereof. The outer free ends of the straps are provided with means for securing the straps to the body of a vehicle, and the means are particularly shown to be hooks 13, in this form of the invention; said hooks being adapted to secure under the edges of the fenders defining the wheel openings D.

Intermediate the looped straps 11, I provide a constricting frame 14 which is adapted to constrict and apply longitudinal inward tension to the straps 11 by means which will be subsequently described. This constricting pressure may be employed in numerous places while working on vehicle bodies, such as straightening door posts and drawing various elements, which may have been bent or forced out of position by accident or other means, into position relative to the other parts. The constricting frame 14 is provided with a pair of spaced parallel substantially square or rectangular plates 15—15 and each plate is provided at diagonal corners with bearing apertures 16—16. A central aperture 17 is formed centrally in one plate while an aperture 18 of reduced size is formed centrally in the other plate 15. The aperture 18 communicates with a concave annular face 19 formed on the inner side face of its plate 15 and this concave face is provided to receive the convex head 20 provided on the end of the piston rod 21 forming a part of the hydraulic servo-motor or ram 22 by means of which the constricting movement of the frame is produced. The opposed end of the ram 22 is provided with a circular boss 23 adapted to fit into the aperture 17 and thus accurately position the ram 22 between the plates 15—15.

The apertures 16 in the opposed plates are disposed 45° offset from each other and from bearings for a pair of substantially U-shaped rods 24—24 having their elongated leg sections 25—25 extending through the apertures of one plate and secured at their ends in the other plate at the corners opposed to the apertures 16. The outer ends of the rods or legs 25 are each provided with a connecting cross bar 26 which extends through a companion loop strap 11, thus securing the constricting frame 14 to the opposed straps 11—11.

It will thus be seen that as the ram 22 expands, the plates 15—15 are moved away from each other and the cross bars 26—26 are drawn inwardly as the legs or rods 25 slidably pass through the apertures 16 of the opposing plate 15, thus applying tensioning pressure to the loop straps 11.

By changing the securing means, indicated at 13 on the drawing, the straps may be employed to secure to almost any surface of a vehicle body being repaired.

In the drawing I have shown one fluid conduit 27 leading to the hydraulic ram 22 and this communicates with any source of fluid under pressure which may be provided with a manually controlled valve to selectively cause the ram 22 to expand, thus constricting the frame 14. It will be understood, however, that I do not wish to be limited to any specific type fluid ram as it is conceivable that a mechanical spreading means may be employed. If desired, a ram having a piston retracting fluid line may also be used. Therefore, I desire to secure a Letters Patent of the United States in the broadest sense as limited only by the appended claims and prior art.

Having thus described my invention, I claim:

1. A tool for repairing vehicle bodies by compression bending distorted sheet metal body members comprising a pair of straps at least one of which is adjustable in length; means carried at the outer ends of the straps for securing to a portion of an auto body; and a constricting frame secured to the inner ends of said straps and having manually controlled power means for constricting said frame to apply sheet metal forming tension to said straps.

2. A tool for repairing vehicle bodies by compression bending distorted sheet metal body members comprising a pair of looped straps adjustable in length; securing means carried at the outer ends of each strap loop; a constricting frame secured to the spaced inner ends of said loops; and manually controlled means for constricting said frame and applying sheet metal forming tension to said straps.

3. A tool for repairing vehicle bodies by compression bending distorted sheet metal body members comprising a pair of adjustable looped straps; securing hooks carried at the outer ends of each strap loop; a constricting frame secured to the spaced inner ends of said loops; said constricting frame having a pair of spaced parallel plates; U-shaped rods each having a cross bar extending through the loops of said straps, and parallel elongated rods extending through apertures in one said plate and being secured to the other plate farthest removed from the cross bar; and a manually controlled hydraulic ram disposed intermediate and adapted to spread said plates whereby sheet metal forming tension is applied to said straps.

4. In a tool for repairing vehicle bodies by compression bending distorted sheet metal body members a constricting frame comprising a pair of spaced parallel plates adapted to receive and support a hydraulic ram therebetween and actionable thereby; oppositely disposed rods having means at their outer ends for securing tensionable straps and extending inwardly through apertures in the plate nearest their outer ends respectively and longitudinally slidable therein; and having their inner ends secured in the plate farthest removed from said strap securing ends, whereby spreading movement of the plates by said ram causes relative inward movement of said strap securing ends.

References Cited in the file of this patent

UNITED STATES PATENTS

| | | |
|---|---|---|
| 2,100,564 | Mandl et al. | Nov. 30, 1937 |
| 2,387,779 | Strauss | Oct. 30, 1945 |
| 2,434,387 | Brandt | Jan. 13, 1948 |

FOREIGN PATENTS

| | | |
|---|---|---|
| 106,532 | Sweden | Feb. 9, 1943 |